(12) United States Patent
Dreher (10) Patent No.: US 12,152,916 B2
(45) Date of Patent: Nov. 26, 2024

(54) STEERING SYSTEM FOR A MOTOR VEHICLE

(71) Applicants: thyssenkrupp Presta AG, Eschen (LI); thyssenkrupp AG, Essen (DE)

(72) Inventor: Simon Dreher, Buchs (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 17/839,114

(22) Filed: Jun. 13, 2022

(65) Prior Publication Data
US 2023/0109220 A1   Apr. 6, 2023

(30) Foreign Application Priority Data

Oct. 6, 2021   (EP) ..................................... 21201197

(51) Int. Cl.
*G01D 5/244* (2006.01)
*B62D 15/02* (2006.01)
*G01D 5/14* (2006.01)

(52) U.S. Cl.
CPC ..... *G01D 5/24471* (2013.01); *B62D 15/0215* (2013.01); *G01D 5/145* (2013.01)

(58) Field of Classification Search
CPC .............. G01D 5/142; G01D 5/24471; G01D 2205/26; G01D 2205/80; B62D 6/10; B62D 5/0463; B62D 15/02; B62D 15/0215; B62D 15/021; B62D 15/022; G01L 3/101; G01L 3/104; G01L 5/221; G01B 7/30
See application file for complete search history.

(56) References Cited

U.S. PATENT DOCUMENTS

| | | | | |
|---|---|---|---|---|
| 6,360,841 B1* | 3/2002 | Blandino | ................ | G01L 5/221 180/443 |
| 2004/0194560 A1* | 10/2004 | Froehlich | ................ | G01L 3/104 73/862.333 |
| 2013/0152702 A1* | 6/2013 | Takahashi | ............... | G01L 3/104 73/862.331 |
| 2015/0040686 A1* | 2/2015 | Maehara | ................ | B62D 15/02 73/862.325 |

(Continued)

FOREIGN PATENT DOCUMENTS

| | | |
|---|---|---|
| EP | 2932217 B1 | 10/2015 |
| FR | 3093181 A1 | 8/2020 |
| WO | 2020/174170 A1 | 9/2020 |

*Primary Examiner* — Steven L Yeninas
(74) *Attorney, Agent, or Firm* — hyssenkrupp North America, LLC (57) ABSTRACT

A steering system for a motor vehicle having a rotation sensor may include a magnetic element that is attached to a steering shaft and is rotatable with the latter about an axis, two stator elements that are arranged fixed coaxially relative to the steering shaft. The stator elements may be spaced apart axially from one another and may be operatively connected to at least one sensor element via two flux conductors. A flux conductor in each case has a collecting portion, a connecting portion, and a compensator portion. The collecting portion is connected to a stator element and is connected to the compensator portion via a connecting portion. The sensor element may be arranged between the two flux conductors. The compensator portion may have a compensator surface that is smaller than or equal to a collecting surface of the collecting portion.

22 Claims, 9 Drawing Sheets

(56) References Cited

U.S. PATENT DOCUMENTS

| | | | | |
|---|---|---|---|---|
| 2015/0276519 | A1* | 10/2015 | Hama | G01L 3/101 |
| | | | | 310/68 B |
| 2016/0214648 | A1* | 7/2016 | Schoepe | G01L 3/104 |
| 2017/0089442 | A1* | 3/2017 | Cymbal | B62D 6/10 |
| 2018/0118259 | A1* | 5/2018 | Diffin | B62D 1/20 |
| 2018/0327024 | A1* | 11/2018 | Nemoto | B62D 6/10 |
| 2020/0158795 | A1* | 5/2020 | Suzuki | G01L 5/0023 |
| 2021/0109166 | A1* | 4/2021 | Tanaka | G01L 5/221 |
| 2021/0223126 | A1* | 7/2021 | Toyama | G01L 3/104 |
| 2022/0136918 | A1* | 5/2022 | Frachon | G01B 7/30 |
| | | | | 73/862.325 |
| 2022/0146346 | A1* | 5/2022 | Frachon | B62D 6/10 |
| 2023/0314250 | A1* | 10/2023 | Fröhlich | G01L 5/169 |
| | | | | 73/862.325 |

* cited by examiner

STEERING SYSTEM FOR A MOTOR VEHICLE

CROSS REFERENCE TO RELATED APPLICATION

This application is a U.S. Non-Provisional Application that claims priority to European Patent Application No. EP 21 201 197.7, filed Oct. 6, 2021, the entire contents of which are incorporated herein by reference.

FIELD

The present disclosure generally relates to steering systems, including steering systems for motor vehicles that have rotation sensors associated with steering shafts.

BACKGROUND

In an electromechanical power-assisted steering system or in a steer-by-wire steering system of a motor vehicle, the rotation sensor serves for detecting a manual steering command. The rotation sensor detects the rotation of a steering shaft by manual actuation of a steering handle, and, additionally or alternatively, the manual steering torque introduced into the steering shaft, and from this generates electric control signals for activating an electric steering drive, which brings about a corresponding steering lock of the steered wheel.

In order to detect a rotational movement, rotation sensors having a magnetic sensor device are known, which rotation sensors can be designed as torque sensors or angle of rotation sensors, or as combined torque and angle of rotation sensors. A rotation sensor of this type is described, for example, in WO 2020/174170 A1. Said rotation sensor comprises two stator elements and a magnetic element which is arranged rotatably relative to the stator elements and is configured in such a manner that it couples a magnetic flux, which is dependent on the relative angle orientation, into the stator elements. Measurement of the magnetic flux coupled into the stator elements makes it possible to determine the rotation of a component having the magnets relative to the stator elements. In order to realize an angle of rotation sensor, it is possible, by fixing the stator elements so as not to rotate relative to one another, to determine the angle of rotation of the steering shaft which is rotatable relative to them and has a magnet. A torque can be determined by the relative rotation of two steering shaft parts coupled via a torsionally elastic element, for example a torsion bar.

The two stator elements are formed annularly from magnetically conductive material and surround the magnetic element coaxially with respect to the axis of rotation. The stator elements have externally encircling attachment portions which are in the form of circular disks, are coupled to a magneto-electric sensor element via magnetic flux conductors and are thereby magnetically operatively connected, the sensor element comprising, for example, a Hall sensor or a magneto-resistive (GMR) sensor element in which the magnetic flux introduced via the flux conductors is converted into an electric signal.

The flux conductors each have a collecting portion which extends over a collecting surface and is connected to the attachment portion of a stator element. The flux conductors each have at least one coupling surface and are formed and designed in such a manner that the coupling surfaces of the two flux conductors lie opposite one another on either side of an air gap. At least one sensor element is arranged between the coupling surfaces. By means of the magnetic field which is generated by the magnetic element and is angle-dependant, referred to as measurement field for short below, a magnetic flux, the measurement flux, is coupled into the stator elements and conducted via the flux conductors to the sensor element.

The measurement may be impaired by external magnetic interference fields that are likewise coupled from the outside into the stator element and generate a magnetic interference flux which is superimposed on the measurement flux. In order to counteract such interferences, it is proposed in the prior art that the flux conductors have at least one compensator portion which is magnetically connected to the collecting portion via a connecting portion and is at a distance from the stator elements. As a result, essentially only the interference field is coupled into the compensator portion. The interference flux generated therein is superimposed with a reverse sign on the measurement flux that is coupled into the collecting portion and on which the interference flux is superimposed, for example by an axially exchanged arrangement of the collecting portions and compensator portions, in which arrangement the compensator portion of the one flux conductor is arranged axially in the region of the collecting portion of the other flux conductor, and vice versa.

The rotation sensors known in the prior art basically permit the measurement of rotational movements even under interfering influences. However, the required high level of reliability under the specific use conditions and the high safety requirements in steering systems of motor vehicles partly cannot be ensured.

Thus a need exists for an improved and more robust detection of steering inputs in a steering system for a motor vehicle.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steering system for a motor vehicle having a rotation sensor. In some examples, a steering system may include a magnet that is attached to a steering shaft and is rotatable with the latter about an axis, and two stator elements which are arranged fixed coaxially relative to the steering shaft, are spaced apart axially from one another and are operatively connected to at least one sensor element via two flux conductors. A flux conductor in each case has a collecting portion, a connecting portion and a compensator portion. The collecting portion is connected to a stator element and is connected to the compensator portion via a connecting portion. The sensor element may be arranged between the two flux conductors.

In the case of a steering system for a motor vehicle having a rotation sensor, comprising a magnet which is attached to a steering shaft and is rotatable with the latter about an axis, and two stator elements which are arranged fixed coaxially relative to the steering shaft, are spaced apart axially from one another and are operatively connected to at least one sensor element via two flux conductors, wherein a flux conductor in each case has a collecting portion, a connecting portion and a compensator portion, wherein the collecting portion is connected to a stator element and is connected to the compensator portion via a connecting portion, and wherein the sensor element is arranged between the two flux conductors, it is provided according to the present disclosure that the compensator portion has a compensator surface which is smaller than or equal to a collecting surface of the collecting portion.

Furthermore, it can preferably be established that, since, in the case of a steering system for a motor vehicle having a rotation sensor, comprising a magnet which is attached to a steering shaft and is rotatable with the latter about an axis, and two stator elements which are arranged fixed coaxially relative to the steering shaft, are spaced apart axially from one another and are operatively connected to at least one sensor element via two flux conductors, wherein a flux conductor in each case has a collecting portion, a connecting portion and a compensator portion, wherein the collecting portion is connected to a stator element and is connected to the compensator portion via a connecting portion, and wherein the sensor element is arranged between the two flux conductors, it is provided according to the present disclosure that the steering shaft comprises an upper steering shaft which is connected to a lower steering shaft via a torsion bar, wherein an anti-twist device which is arranged on the upper steering shaft is brought into engagement with an anti-twist device, which is arranged on the lower steering shaft, for limiting a twisting of the torsion bar in itself, and wherein the compensator portion has a compensator surface which is smaller than a collecting surface of the collecting portion, a considerable improvement in the accuracy of the robustness of detecting the steering inputs can be achieved.

Furthermore, it can preferably be established that, since in the case of a steering system for a motor vehicle having a rotation sensor, comprising a magnet which is attached to a steering shaft and is rotatable with the latter about an axis, and two stator elements which are arranged fixed coaxially relative to the steering shaft, are spaced apart axially from one another and are operatively connected to at least one sensor element via two flux conductors, wherein a flux conductor in each case has a collecting portion, a connecting portion and a compensator portion, wherein the collecting portion is connected to a stator element and is connected to the compensator portion via a connecting portion, and wherein the sensor element is arranged between the two flux conductors, it is provided according to the present disclosure that the steering shaft comprises an upper steering shaft which is connected to a lower steering shaft via a torsion bar, wherein an anti-twist device which is arranged on the upper steering shaft is brought into engagement with an anti-twist device, which is arranged on the lower steering shaft, for limiting a twisting of the torsion bar in itself, and a gearwheel is provided which is fixed to one of the two steering shafts and rotationally symmetrically surrounds the torsion bar, wherein the compensator portion has a compensator surface which is smaller than a collecting surface of the collecting portion, a considerable improvement in the accuracy of the robustness of detecting the steering inputs can be achieved. The gearwheel is preferably coupled to an electric drive via a transmission.

The stator elements which are annular in their basic shape preferably have attachment portions which are in the shape of circular disks or circular rings, extend extensively transversely with respect to the axis and which are synonymously also referred to as attachment flanges. The attachment portions preferably have axial surfaces on their inner sides directed toward one another and on their outer sides facing away from one another.

The preferably flat surface extent of a collecting portion corresponds by definition to the collecting surface, and, correspondingly, the preferably flat surface extent of a collecting portion corresponds by definition to the compensator surface. In each case one collecting portion is magnetically connected to one of these axial surfaces, wherein the collecting surface can entirely or partially make contact in a planar manner with an axial surface of an attachment portion. The compensator portions are arranged radially outside the stator elements, and the compensator surfaces preferably extend outside the attachment portions.

Preferably, the inner and outer sides of the attachment portions of the stator elements, and the collecting surfaces and the compensator surfaces are flat at least in sections and are oriented transversely with respect to the axis, i.e. have mutually parallel axial surfaces at least in regions.

According to the present disclosure, the surface extent of the compensator portion is smaller than, or at maximum equal to, the surface extent of the collecting portion. It can thereby be ensured that the portion of a magnetic interference field that is used for compensating for the measurement signal and that is detected by the compensator portions and is also referred to as compensation flux, is kept in an optimum order of magnitude. In particular, it is possible to prevent an overcompensation that might otherwise lead to a distortion of the measurement result. This results in the advantage of greater measurement accuracy of the measurement of the angle of rotation, resulting in greater operational reliability. This is particularly advantageous for a motor vehicle steering system, and this is highly relevant in terms of safety for the operation.

In order to calculate the surface ratio, the values of the surface projections in a predetermined direction can preferably be used, for example the collecting and compensator surfaces projected in an axial direction. It can thereby be ensured that an external magnetic interference field passing through the collecting and interference surfaces can be better compensated for.

It is advantageous that the surface ratio of collecting surface and compensator surface is between 1 and 4, i.e. the collecting surface is between 1 and 4 times the compensator surface. A further optimization can make provision for the surface ratio to be between 1 and 2. Advantageous developments can have a surface ratio of between 1.5 and 2, or in a narrower range between 1.5 and 1.75.

It can be particularly advantageous for the surface ratio of collecting surface and compensator surface to be 1.75.

The optimized effect in the ranges according to the present disclosure of the ratio, and in particular for the aforementioned specific ratio, can be explained by the fact that external interference fields impinge unobstructed on the externally exposed compensator surfaces, but the collecting surfaces are at least partially shielded against external interference fields by the stator elements or the attachment portions of the stator elements.

Furthermore, it has been established that an anti-twist device results in a local accumulation of ferromagnetic material in the steering system, which has an effect on the magnetic interference flux resulting from the external magnetic interference fields by deflecting the flux. Gearwheels which are arranged on one side with respect to the rotation sensor may also have an effect on the magnetic interference flux resulting from the external magnetic interference fields by deflecting the flux. However, with the solutions proposed according to the present disclosure, it is possible for such steering systems to constitute a considerable improvement in the detection of the steering input.

The cause-effect relationships of the surface ratios at the basis of the present disclosure have not been recognized or identified as a problem in the prior art, and, consequently, the specific problems resulting therefrom in the use of a magnetic rotation sensor in a motor vehicle steering system have not been able to be solved as a result. Accordingly, the size ratios proposed according to the present disclosure reproduce a favourable representation for installing in a motor vehicle steering system.

A further practical advantage is that the compensator portions protrude outward less far over the stator elements, as a result of which less construction space is taken up within the steering column.

It can preferably be provided that the flux conductors are formed as integral sheet metal formed parts. The sheet metal parts are composed of a magnetically readily conductive material, for example an iron sheet with defined magnetic properties. The manufacturing can be undertaken efficiently by pressing, punching, precision cutting, bending, embossing or the like. The flux conductor can thereby have a substantially continuously identical material thickness which substantially corresponds to the sheet metal thickness. In an embodiment with collecting and compensator surfaces oriented transversely with respect to the axis, the sheet metal thickness corresponds to the axial thickness of the collecting and compensator portions.

A preferred value for the sheet metal thickness is between 0.6 mm and 1 mm, particularly preferably 0.8 mm.

An advantageous embodiment can be realized in that the flux conductors are crossed between the compensator portions and the collecting portions in the region of the connecting portions such that the compensator portions and the collecting portions lie axially opposite one another. The axial positions are exchanged here. This means that the collecting portion of the one flux conductor and the compensator portion of the other flux conductor lie axially on one side, and the collecting portion of the other flux conductor and the compensator portion of the first flux conductor lie axially opposite one another on the other side. This results in an arrangement which is mirror-symmetrical with respect to a mirror plane transversely with respect to the axis. As seen in the circumferential direction, an X-shaped configuration is formed by the connecting lines between the collecting and compensation portions. This permits an effective compensation of external magnetic interference influences.

It is advantageous that the compensator surfaces and the collecting surfaces of the flux conductors are predominantly parallel to one another and to attachment portions of the stator elements, to which the collecting portions are connected. The attachment surfaces of the stator elements are formed preferably in the form of circular disks or circular rings with axial surfaces which are connected to corresponding axial portions of the collecting portions. Predominantly should be understood in each case as meaning that at least 75% of the compensator surfaces and the collecting surfaces are oriented parallel to one another.

It can preferably be provided that the collecting portions are attached on axially opposite inner sides of the stator elements. As a result, the two flux conductors can be accommodated in a protected manner and with construction space optimization axially between the attachment portions, with the collecting portions contacting the inner axial end sides of the attachment portions.

An advantageous embodiment can be the fact that the axial distance between the collecting portions is smaller than the axial distance between the compensator portions. The collecting portions are offset inward in the axial direction relative to the compensator portions. As a result of the collecting portions being connected to the inner sides of the attachment portions of the stator elements, an improved structural integration and a smaller construction space are made possible.

An optimized development can make provision for the compensator portions to be aligned flush with the attachment portions of the stator elements. It is meant by this that an axial plane extends through the compensator portions and the attachment portions in the shape of circular disks or circular rings; in other words, the cross section thereof intersect, as seen in the radial direction. This can be achieved, for example, by the collecting portions being connected to the inner sides of the attachment portions and being offset axially inward relative to the compensator portions by the axial thickness of the attachment portions. As a result, advantages with respect to a better compensation effect, in particular in the case of inhomogeneous interference fields, can be realized.

In order to realize the abovementioned embodiment, it can be provided that the axial distance between the collecting portions is smaller than the axial distance between the compensator portions. The axial distance between the outer sides of the collecting portions corresponds here to the distance between the inner sides of the attachment portions of the stator elements.

It can be provided that the compensator portions are connected to coupling portions which have coupling surfaces facing the sensor element. These coupling portions can be designed as narrow, finger-like strips which are therefore also referred to as flux fingers. The coupling portions protrude into the axial intermediate space between the flux conductors such that the coupling surfaces, which are preferably oriented parallel to one another and to the compensator surfaces, lie axially opposite one another on either side of the sensor element. They can be magnetically coupled to the sensor element in direct contact or via a defined air gap. The coupling portions can be formed together with the connecting portions, wherein a connecting portion has at least one coupling surface. Alternately or additionally, flux fingers can be formed separately from the connecting portions. Preferably, at least one flux finger can emerge from the compensator portion, the flux finger not being connected directly to the collecting portion and being at a distance from the connecting portion that connects said compensator portion to the collecting portion. In its protruding end region, a flux finger can have a coupling surface which faces a corresponding coupling surface on a flux finger or a connecting portion of the other flux conductor. The arrangement and configuration of the coupling portions permits an optimized superimposition and compensation of interference fields.

It is possible for a sensor element to be used. It can furthermore be advantageous for at least two sensor elements to be provided at a distance from one another. Sensor elements which can be used are, for example, Hall sensors or magneto-resistive (GMR) sensors. By doubling or multiplying the sensors, it is possible for the measurement values to be averaged and/or prepared metrologically in some other way. The safety and the arrangement can also be increased in this way by redundancy. The sensor elements are preferably spatially remote from one another and, for example, are at a distance in the circumferential direction with respect to the axis. As a result, the interference fluxes that are coupled into the compensator portions can be measured with spatial resolution, thus permitting a further improvement in the compensation for interference fields.

An advantageous development can make provision for a compensator portion to have an angled wing portion. A wing portion, synonymously also referred to as a winglet, forms a partial portion or edge portion which is bent over transversely with respect to a flat, preferably axial compensator surface and which can extend, for example, substantially parallel to the axis and thus protrudes into the intermediate space between the attachment portions of the stator elements. A winglet can preferably be directed towards the respective other compensator portion. The axial extent of a winglet is preferably smaller than the axial distance between the compensator portions. One advantage is that the active region of the compensator portion for detecting interference fields can be increased, even with respect to interference fields interfering obliquely. The compensation effect can thereby be optimized.

It can advantageously be provided that the flux conductors and the sensor element are arranged in a housing. A housing (sensor housing) can be manufactured, for example, from plastic, for example as an injection moulded part, and protects the components accommodated in its interior. In an advantageous development, it is possible for the housing to be filled with a potting compound. The latter can be inserted as liquid resin which flows around the flux conductors and the sensor element and hardens to form a solid block in which the flux conductors and the sensor element are then firmly embedded substance-to-substance and/or in a form-fitting manner. An unambiguous positioning is thereby non-releasably fixed, which has a positive effect as regards long term stable measurement accuracy.

It can be provided that a compensator portion and/or a collecting portion have/has a guide portion. The guide portion permits the guiding and positioning in a housing or on another component of the rotation sensor that has a corresponding guide element, for example a guide groove. A guide portion can have, for example, a guide projection, a guide lug, guide rail or the like that protrudes outwards from the compensator portion and can brought into form-fitting guiding engagement with a corresponding guide element, for example by being pushed into a guide groove. As a result, an improved positioning and fixing of the flux conductors can take place, which is advantageous both for the installation and for the operational reliability.

It can be provided that a compensator portion and/or a collecting portion and/or a stator element have/has a stop portion. A stop portion is designed and arranged in such a manner that it can be brought to a mechanical stop against a corresponding counter stop so as to be able to be simply and precisely positioned mechanically relative to one another. A stop portion can have, for example, a protrusion or the like which can strike against a corresponding surface or edge. For example, a collecting portion can have an axially protruding stop portion which, upon installation in the radial direction, can strike against an outer edge of an attachment portion of a stator element. The collecting portion is then already positioned exactly relative to the stator element, as a result of which the manufacturing is simplified.

It can preferably be provided that a collecting portion of the one flux connector and a compensator portion of the other are at a radial distance from one another which has a ratio with respect to a radial width of the collecting portion of the other flux conductor of between 0.5 and 2. This permits a further optimization of the compensation effect. The ratio can preferably be between 0.75 and 1.5. Furthermore preferably, it can be between 0.75 and 1.25, and even more preferably between 0.8 and 1.2.

It may be particularly advantageous for the ratio of the aforementioned distance with respect to the width to be 1 such that the radial distance corresponds to the radial width of the collecting portion.

It can be provided that the collecting portion of the one flux conductor has an axial height difference with respect to the compensator portion of the other flux conductor, which axial height difference has a ratio with respect to an axial thickness of a collecting portion of between 0.5 to 2. The axial distance corresponds to the above-explained sheet metal thickness. The above-described flush alignment of the compensator portions with the attachment portions of the stator elements is thereby simplified. The ratio can preferably be 0.75 to 1.5, or furthermore preferably between 0.75 to 1.25, or even more preferably between 0.8 and 1.2. An improved flush alignment of the compensator portion with the attachment portion of the stator element can thereby be permitted.

It can be particularly advantageous for the aforementioned axial height difference to be equal to the axial thickness, which corresponds to a ratio of 1.

It is advantageously possible for the collecting portion of the one flux conductor to have an axial height difference with respect to the compensator portion of the same flux conductor, which axial height difference has a ratio with respect to an axial height difference between the attachment portions of the two flux conductors of between 0.75 and 2.2. The axial distance of the attachment portions is measured in the axial direction between the sides to which the collecting portions are attached, for example the abovementioned inner sides. The ratio can preferably be between 0.85 and 1.2, or particularly preferably between 0.9 and 1.15.

It can be particularly advantageous for the aforementioned axial height difference to have a value of 1.125.

It can preferably be provided that in the region in which the sensor element is arranged, the two flux conductors have an axial height distance in the range of 1.8 to 2.2 of an axial thickness of the flux conductors. The height distance refers to the axial gap between the flux conductors, the axial thickness of which corresponds to the above-explained sheet metal thickness.

It is advantageous that an axial height difference between the flux conductors and the sensor element is smaller than an axial thickness of the flux conductors. This height distance refers to the air gap which exists between the sensor element and the abovementioned coupling surfaces and which is intended to be as small as possible in order to ensure an efficient transmission of the magnetic flux. If the sheet metal thickness is used as the axial distance, it is advantageous for the height distance to correspond to 0.6 times to 1 time the sheet metal thickness, particularly preferably to the single sheet metal thickness.

The axial distance between the connection portions of the stator elements can be between 10 to 30 times the axial thickness of the flux conductors, which thickness corresponds to the abovementioned sheet metal thickness which can be, for example, 0.8 mm. The distance can preferably be 12 to 25 times, particularly preferably 12 to 15 times.

It may be particularly advantageous for the aforementioned axial distance to correspond to 15 times the sheet metal thickness.

The abovementioned angled wing portion (winglet) can protrude from the compensation surface preferably by 2 to 7 times the axial thickness (sheet metal thickness) of the compensation portion. An axial height of the winglets can preferably correspond to between 2.5 and 5 times the sheet metal thickness, particularly preferably to 2.7 to 3.3 times.

It may be particularly advantageous for a winglet to protrude from the compensator portion by 3.3 times the sheet metal thickness.

In the various figures, identical parts are always provided with the same reference signs and are therefore generally also named or mentioned only once in each case.

Figure 1:
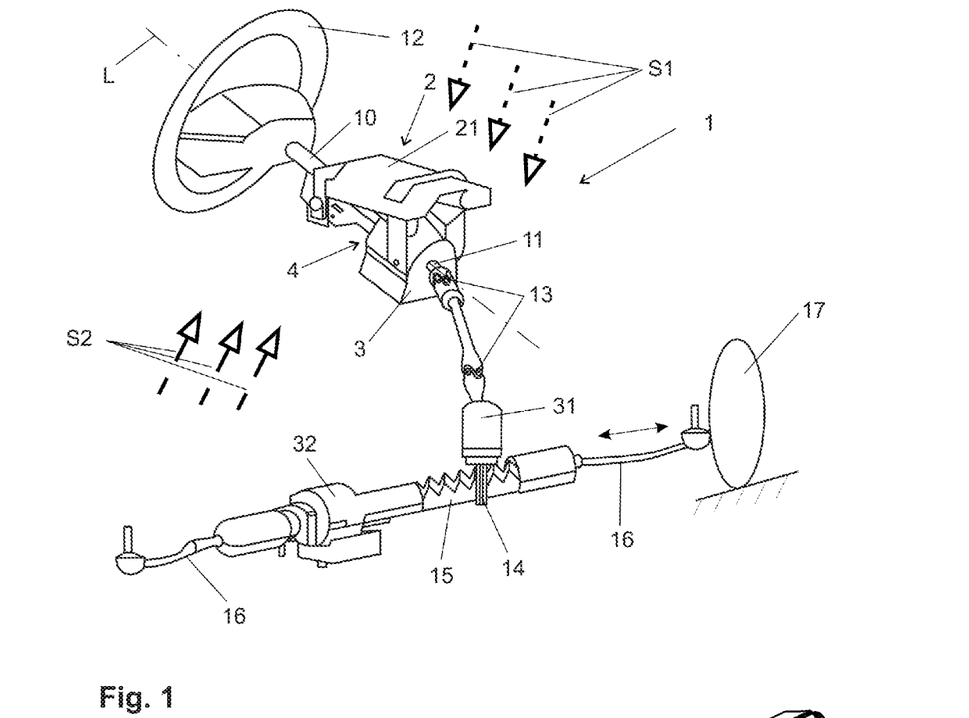
FIG. 1 is a schematic perspective view of an example motor vehicle steering system.

FIG. 1 schematically illustrates a motor vehicle steering system 1 designed as an electromechanical power-assisted steering system. The latter has a steering column 2 with a supporting unit 21 which can be attached to a motor vehicle body, not illustrated.

In the steering column 2, a first, upper steering shaft part 10 of a steering shaft is mounted rotatably about a longitudinal axis L. At the rear end with respect to the direction of travel, a steering wheel 12 is attached to the steering shaft part 10 for conjoint rotation, via which steering wheel a driver can introduce a steering torque (manual torque) as a steering command into the upper steering shaft part 10.

The upper steering shaft part 10 is connected to a second, lower steering shaft part 11 via a torsionally elastic torsion bar, not illustrated.

The steering torque is transmitted via the steering shaft parts 10 and 11, via interconnected cross joints 13, to a steering pinion 14 which engages in a rack 15 mounted in a longitudinally displaceable manner. The latter converts a rotation of the steering shaft 10 during a steering intervention into a displacement of track rods 16, as indicated by the double arrow, which transmit the predetermined steering intervention as a steering lock to the steerable wheels 17 of the motor vehicle.

An electric power-assisted support can have a power-assisted drive 3, which is attached to the steering column 2 and is coupled to the steering shaft 10, or a power-assisted drive 31 which is coupled to the steering shaft part 11 at the pinion 14, wherein the power-assisted drives 3 and 31 can be constructed identically. By means of the power-assisted drive 3 or 31, an auxiliary torque can be coupled into the lower steering shaft 11 and/or the steering pinion 14 in order to assist the driver during the steering operation.

A power-assisted drive 32 can also be provided in order to introduce auxiliary power, which assists the steering system, into the rack 15.

Conventionally, a power-assisted drive 3, 31 or 32 is attached only at one of the three positions shown. The auxiliary torque or the auxiliary power which is intended to be applied by means of the respective power-assisted drive 3, 31 or 32 in order to assist the driver is determined by taking into consideration a steering torque that is determined by a rotation sensor 4 and is introduced manually by the driver. For this purpose, the rotation sensor 4 has a torque sensor which detects the relative rotation of the steering shaft parts 10 and 11, said relative rotation being dependant on the magnitude of the manually introduced steering torque. Furthermore, an angle of rotation sensor is preferably provided, for detecting the angular position of the steering shaft part 10 and/or 11.

Figures 14, 14A:
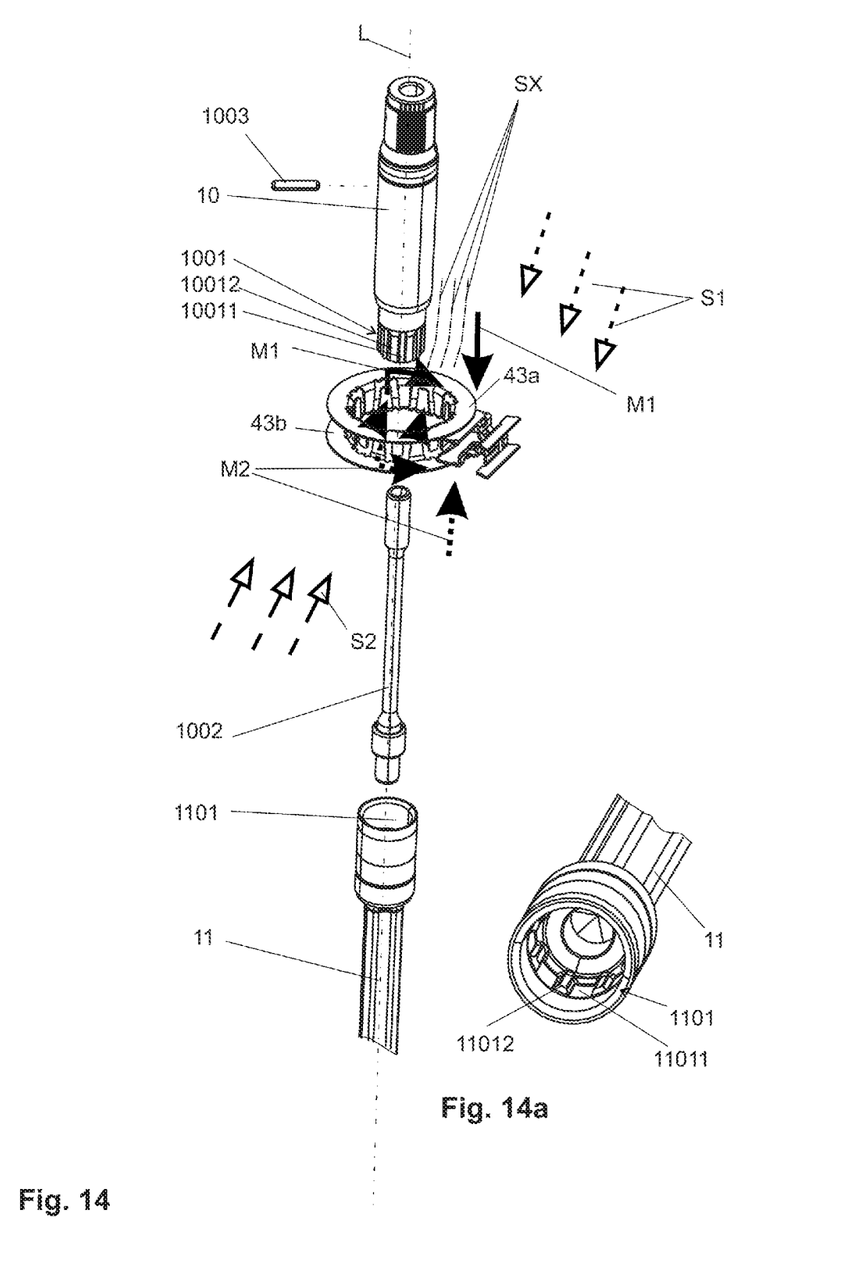
FIG. 14 is an exploded view of an inner train of a steering system with a rotation sensor.
FIG. 14a is a perspective view of a portion of a steering shaft part from FIG. 14 with an anti-twist device.

FIG. 14 shows the inner train of the steering system 1, as is illustrated in FIG. 1. According to FIG. 14, the embodiment is shown in which the power-assisted drive by means of the power-assisted drive 31 of FIG. 1 is illustrated. The upper steering shaft part 10 is connected to the lower steering shaft part 11 via a torsionally elastic torsion bar 1002 fixed with a pin 1003. When a torque is introduced into the steering wheel 12, the upper steering shaft part 10 is therefore rotated and transmits the torque via the torsion bar 1002 to the lower steering shaft part 11. Since the rotation initially encounters a resistance, the torsion bar 1002 twists in itself such that the upper steering shaft part 10 has an angle of rotation in relation to the lower steering shaft part that is correspondingly detected by the rotation sensor 4, of which only individual elements are shown in FIG. 14.

In order for the rotation to be limited and a mechanical overloading of the torsion bar 1002 to be avoided, an anti-twist device, consisting of a first anti-twist device 1001 which engages in a second anti-twist device 1101 is provided. The protrusions 10012 of the first anti-twist device engage with predefined angular play in recesses 11011 of the second anti-twist device. The protrusions 10012 of the second anti-twist device engage in recesses 11011 of the first anti-twist device, likewise with a predefined angular play. If the intended angular play is achieved, the maximum twisting of the torsion bar 1002 in itself is achieved. For better illustration, the second anti-twist device 1101 is illustrated in a different view in FIG. 14*a*.

Said anti-twist devices 1001 and 1101 have a considerable effect on the course of the interference fluxes S1 and S2. The magnetic flux of the interference flux S1 and the magnetic flux of the interference flux S2 are subjected by means of said anti-twist devices 1001 and 1101 to a flux deflection SX and thereby changed.

Figures 15, 15A:
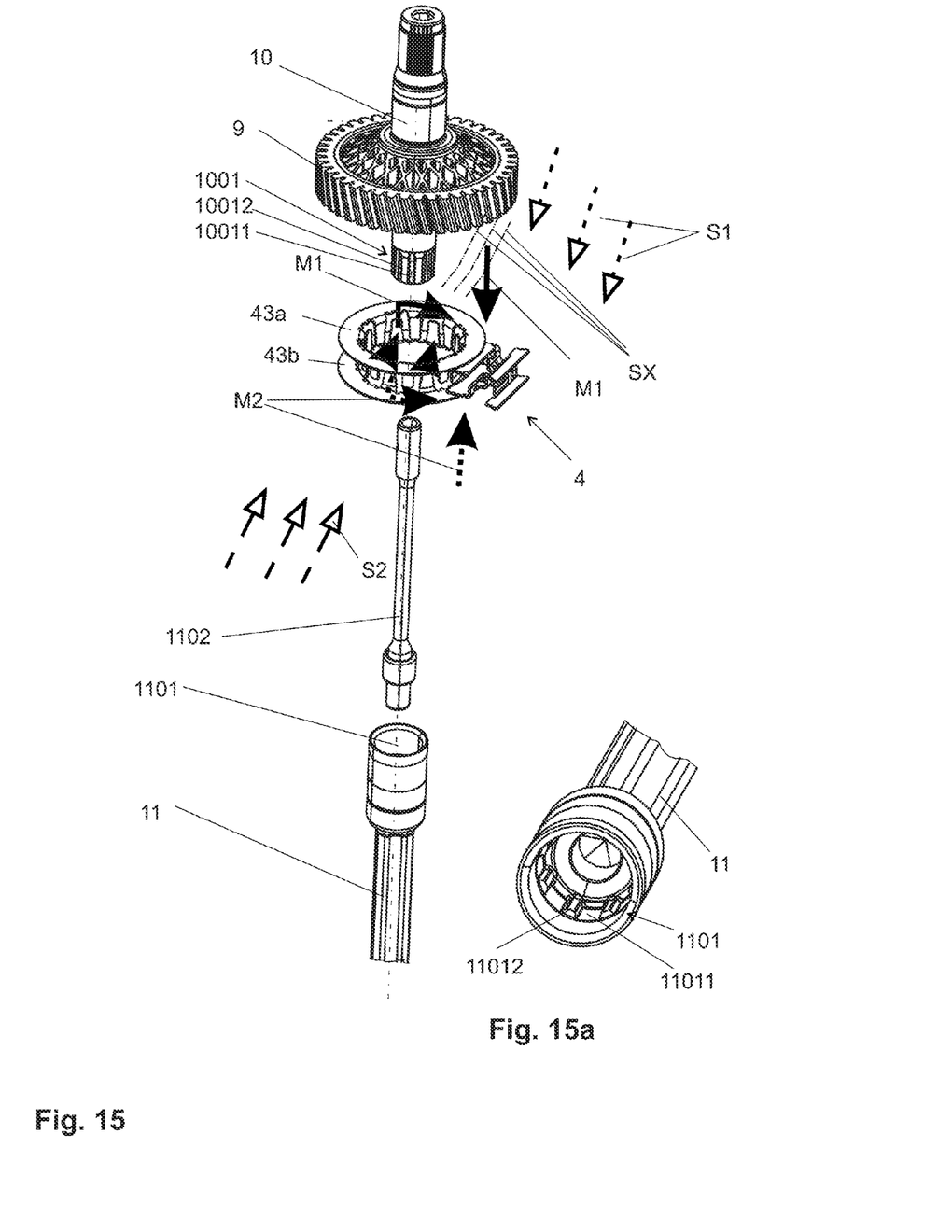
FIG. 15 is an exploded view of an inner train of a steering system with a rotation sensor.
FIG. 15a is perspective view of a portion of a steering shaft part from FIG. 15 with an anti-twist device.

FIG. 15 shows the inner train of the steering system 1, as illustrated in FIG. 1. FIG. 15*a* shows the second anti-twist device 1101 according to the embodiment of FIG. 15 in a different view. According to FIG. 15, the embodiment is shown in which the power-assisted drive is illustrated by means of the power-assisted drive 3 of FIG. 1. This means in the exemplary embodiment that a gearwheel 9 which surrounds the torsion bar rotationally symmetrically is arranged directly in the vicinity of the rotation sensor 4. The gearwheel 9, designed in the example as a worm gearwheel, is coupled in the steering system to an electric drive, not illustrated, via a transmission arrangement, not illustrated, preferably a worm transmission. Apart from this, the features are analogous to the embodiment corresponding to the embodiment shown in FIG. 14, and therefore a repeated reproduction of the description can be omitted.

However, the gearwheel 9 has an even greater influence on the interference fluxes S1 and S2, in particular if it has a ferromagnetic core for fastening to one of the two steering shafts. The interference fluxes S1 and S2 are subjected to an even greater flux deflection SX and are thereby changed.

Figure 2:
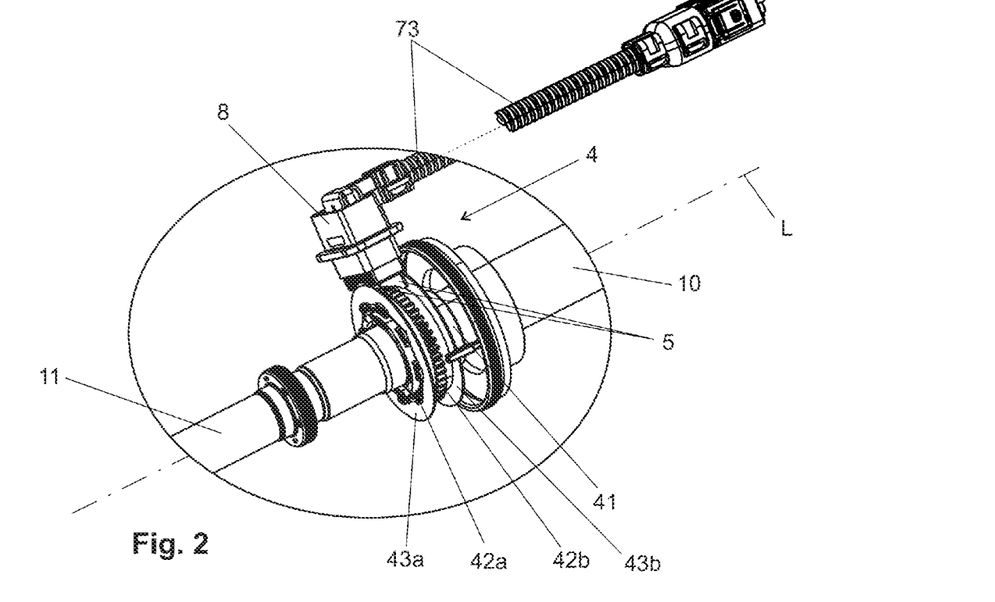
FIG. 2 is an enlarged, detail, exposed, schematic view of an example rotation sensor (i.e., the sensor device) of a steering system according to FIG. 1.

The rotation sensor 4 is attached between the upper steering shaft part 10 and the lower steering shaft part 11, as can be seen in the enlarged illustration of FIG. 2 that shows a schematic perspective view of the steering column 2 from FIG. 1 in an enlarged form.

Attached coaxially to the steering shaft part 10 is a magnet 41 which can be designed as a ring magnet and is arranged within two annular stator elements 42*a,b* which are attached coaxially to the second steering shaft part 11. The stator elements 42*a,b* have attachment portions 43*a,b* which are designed in the shape of circular disks and protrude radially outward. The attachment portions 43*a,b* have axial surfaces, which are transverse with respect to the axial L, on their inner sides directed axially towards one another and on their outer sides directed axially away from one another.

The two stator elements 42*a,b* are coupled in a magnetically conducting manner to two flow conductors 5*a,b* which are illustrated in various views in FIGS. 4 to 8.

The flux conductors 5*a,b* are designed as integral sheet metal formed parts and have a collecting portion 51*a,b* and are compensator portion 52*a,b* which are connected to one another via web-shaped connecting portion 53*a,b*. The collecting portions 51*a,b* and the compensator portions 52*a,b* extend parallel to an axial surface which is perpendicular to the axis, wherein collecting portions 51*a,b* each extend over a collecting surface, and the compensator portions 52*a,b* each correspondingly extend over a compensator surface.

Figure 16:
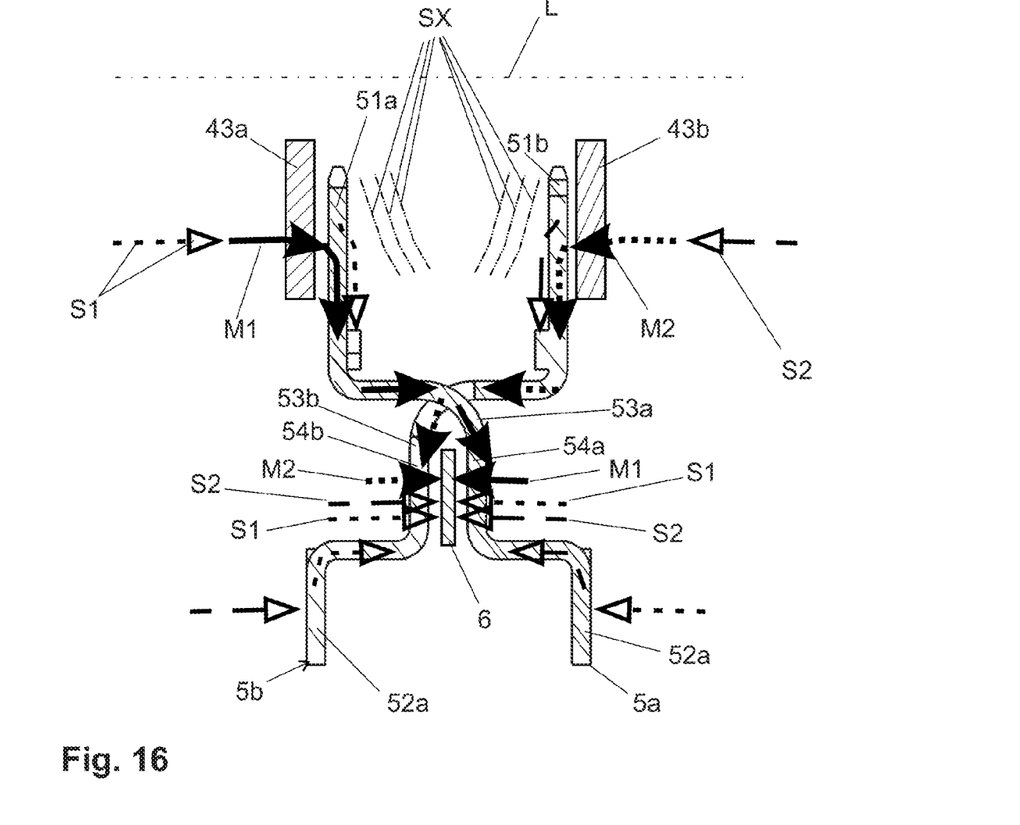
FIG. 16 is a cross-sectional view from FIG. 6 showing flux deflection.

FIG. 16 shows the effect of the flux deflection SX on the interference flux S1 and S2 at the collecting portions 51*a* and 51*b*. The accumulation of ferromagnetic components, like the anti-twist devices 1001, 1101 and possibly additionally a gearwheel 9, in particular as shown in the example, a worm gearwheel with a metal core, change the ratios of the magnetic flux in such a manner that the sizes of the surfaces of the collecting portions 51*a* and 51*b* have to be correspondingly adapted in a ratio to the surfaces of the compensator portions 52*a* and 52*b*.

According to the present disclosure, the collecting surface is in each case larger than or equal to the compensator surface, preferably in one of the abovementioned surface ratios according to the present disclosure.

Figure 5:
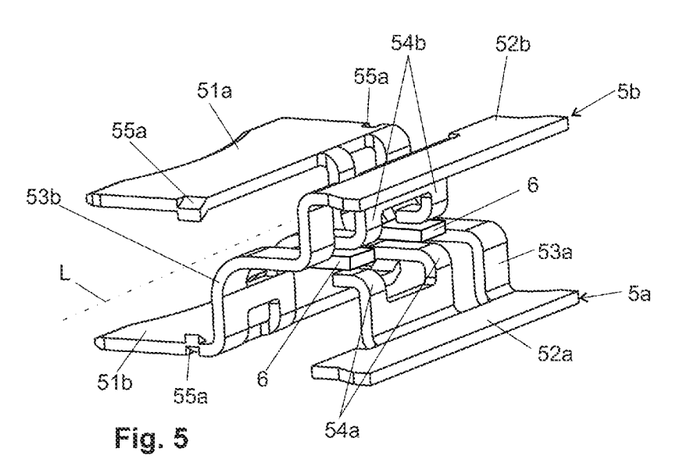
FIG. 5 is an enlarged, exposed, schematic, perspective view of the flux conductors according to FIG. 4.

Flux fingers 54*a,b* are attached to the compensator portions 52*a,b*, the flux fingers protruding axially into the intermediate space between the attachment portions 43*a,b* and serving as coupling elements. Sensor elements 6 for the magnetic flux measurement, for example Hall sensors or GMR sensors, are arranged in the axial air gap between the flux fingers 54*a,b*. As can be seen in FIG. 5, two sensor elements 6, for example, can be provided which are arranged spaced apart in the circumferential direction between coupling portions in the end regions of flux fingers 54*a,b* which are spaced apart from one another.

As can be seen in FIGS. 3, 4, 6 and 8, the collecting portions 51*a,b* are attached to the inner sides of the attachment portions 43*a,b*.

The flux conductors 5*a*, 5*b* are crossed between the compensator portions 52*a,b* and the collecting portions 51*a,b* in the region of the connecting portions 53*a,b* such that they lie axially opposite one another. The axial positions are exchanged such that the collecting portion 51*a* of the one flux conductor 5*a* and the compensator portion 52*b* of the other flux conductor 5*b* lie axially on the side where the attachment portion 43*a* of the one stator element 42*a* is arranged, and the collecting portion 51*b* of the other flux conductor 5*b* and the compensator portion 52*a* of the first flux conductor 5*a* lie axially opposite one another on the other side. This forms an arrangement which is mirror-symmetrical with respect to a mirror plane which is transverse with respect to the axis L. As seen in the circumferential direction, an X-shaped configuration is formed by the connecting lines along the connecting portions 53*a,b* between the collecting portions 51*a* and compensator portions 52*b*, as can clearly be seen in FIGS. 6 and 8.

In FIGS. 3, 4, 6, 10 and 11, the magnetic flux which is coupled into the one stator element 42*a* by the magnet 41 is referred to as measurement flux M1, and the magnetic flux coupled into the other stator element 42*b* as measurement flux M2. The measurement fluxes M1 and M2 are indicated by solid arrows.

External interference fields are indicated as outlined arrows in FIGS. 1, 3, 4, 6, 10 and 11; said external interference fields generating magnetic interference fluxes S1 and S2.

Figure 3:
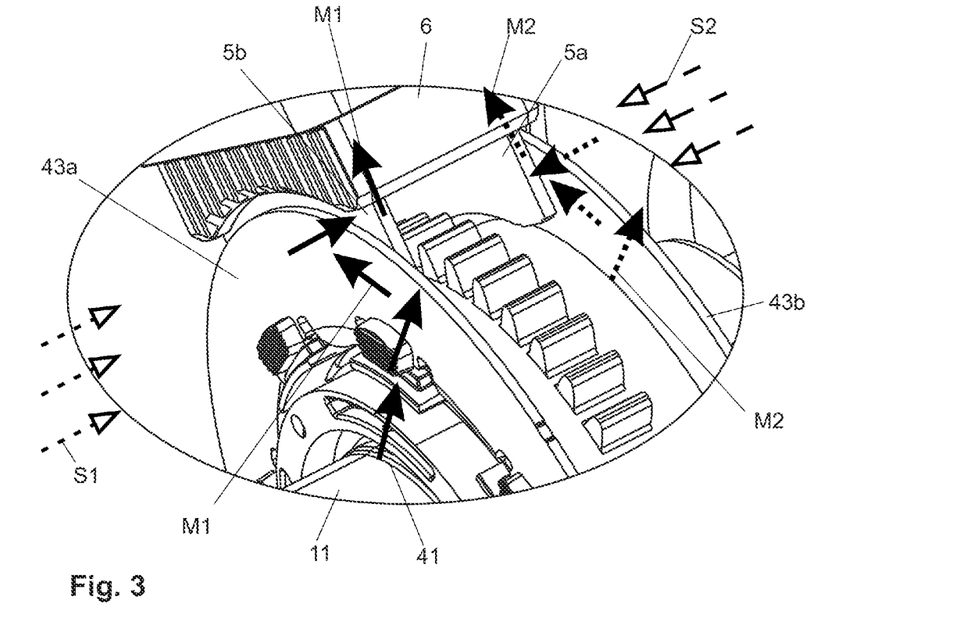
FIG. 3 is an enlarged, detail view of an example rotation sensor according to FIG. 2.
Figure 4:
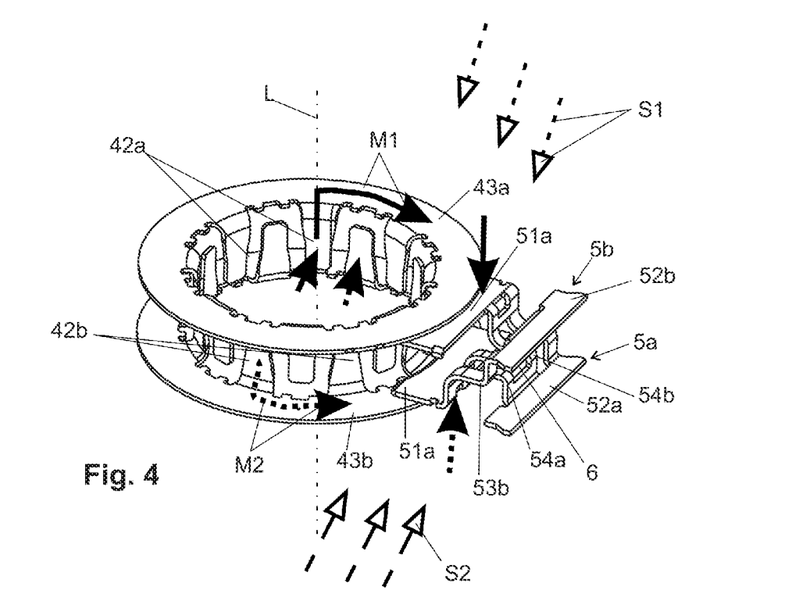
FIG. 4 is a schematic, perspective, exposed view of stator elements and flux conductors.

The measurement flux M1 coupled into the stator element 42*a* by the magnet 41 is conducted via the attachment portion 43*a* into the collecting portion 51*a* of the flux conductor 5*a* and introduced via the connecting element 53*a* and the compensator element 51*a* into the sensor element 6 by the flux finger 54*a*. Accordingly, the measurement flux M2 passes through the collecting portion 51*b* of the flux conductor 5*b*, via the connecting element 53*b* and the compensator element 51*b* to the axially opposite side of the sensor element 6 by means of the flux finger 54*b*. This is illustrated in FIGS. 3 and 4.

The external magnetic interference fields are at least partially coupled as interference fluxes S1 and S2 into the stator elements 42*a,b*, the attachment portions 43*a,b*, and the collecting portions 51, and into the compensator portions 52*a,b*. As indicated schematically in the sectional view of FIG. 6, in the coupling portion of the flux finger 54*a* that is coupled axially to the sensor element 6, the measurement flux M1 is superimposed by the interference fluxes S1 and S2. Analogously, in the coupling portion of the other flux finger 54b, the other measurement flux M2 is likewise superimposed by the interference fluxes S1 and S2.

Figure 6:
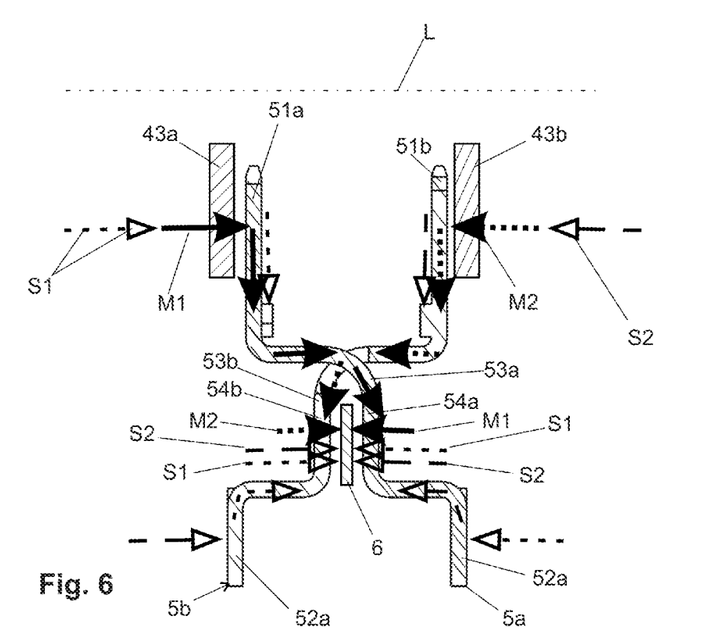
FIG. 6 is a partial, radial, sectional view through the rotation sensor according to FIG. 2 or 3 (in a view in a circumferential direction).
Figure 7:
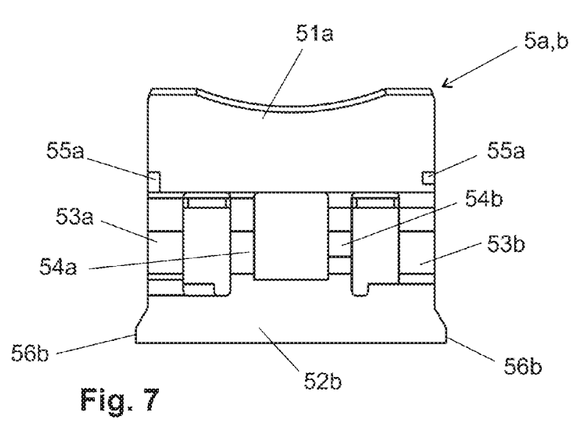
FIG. 7 is an axial view of the flux conductors according to FIG. 5.

Via the flux fingers 54a,b, the interference fluxes S1 and S2 coming from the collecting portions 51a,b and from the compensator portions 52a,b are coupled with opposite signs into the sensor element 6. As a result, they are compensated for and ideally mutually cancel one another out such that only the measurement fluxes M1 and M2 are measured by the sensor element 6.

Figure 8:
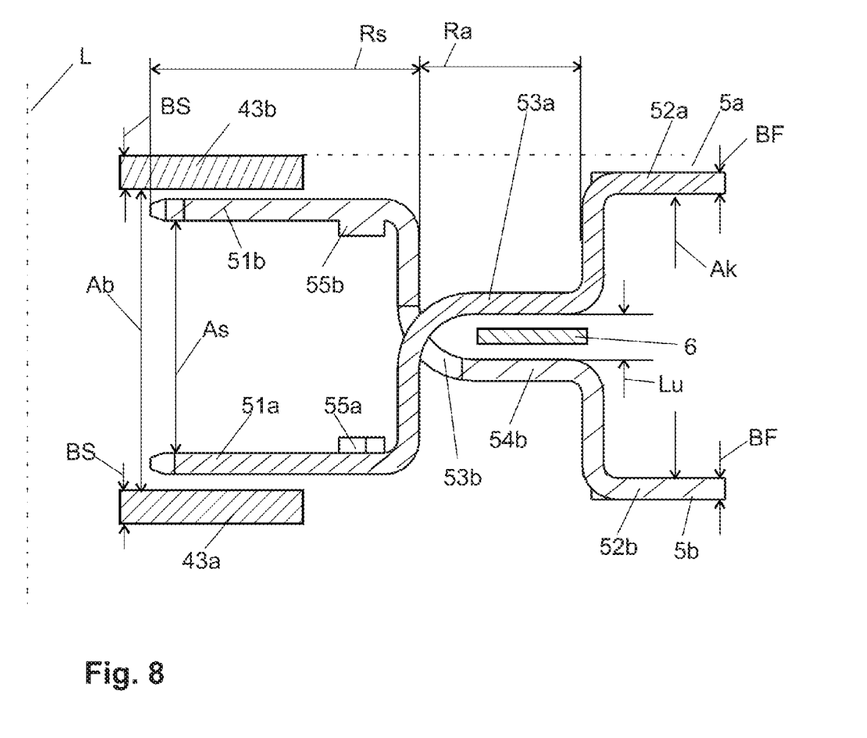
FIG. 8 is an enlarged, sectional view similar to FIG. 6.

The collecting portions 51a,b can have protruding stop portions 55a,b which, in the example, can protrude axially inwards, as shown in FIGS. 5 and 8, and, additionally or alternatively, outwards, and/or in the circumferential direction. They can be formed integrally, for example by bending over the metal sheet.

The compensator portions 52a,b can have guide portions 56a,b protruding laterally, in the example in the circumferential direction. The latter can be designed as integrally formed guide lugs.

The collecting surface, i.e. the axial surface of a collecting portion 51a,b, is, according to the present disclosure, larger than the compensator surface, i.e. the axial surface of a compensator portion 52a,b. The surface ratio can preferably lie in accordance with the ranges defined above in the description of the present disclosure.

The stator elements 42a,b including the attachment portions 43a,b can be formed from sheet metal with a sheet metal thickness BS which can be, for example, 0.8 mm.

The flux conductors 5a,b can be formed integrally as sheet metal formed parts from sheet metal with a sheet metal thickness BF which can be, for example, 0.8 mm.

The compensator portions 52a,b can have an axial height difference relative to the collecting portions 51a,b, which axial height difference approximately corresponds to the sheet metal thickness BF or BS such that the compensator portions 52a,b are substantially flush with the attachment portions 43a,b, as indicated schematically in FIG. 8.

The collecting portions 51a,b can be at an axial distance As which is smaller than the axial distance Ak of the compensator portions 52a,b.

The compensator portions 52a,b can be at a radial distance Ra relative to the collecting portions 51a,b, said radial distance being in relation to the radial width Rs of the collecting portions 51a,b (as measured in the direction of the distance Ra) as is defined above in the description of the present disclosure.

In the region of the sensor element 6, the flux fingers 54a,b are at an axial distance Lu of the air gap from one another which can preferably be a ratio with respect to the sheet metal thickness BF in accordance with the ranges defined above in the description of the present disclosure. It is advantageous here for an axial height distance between the flux fingers 54a,b and the sensor element 6 to be smaller than the sheet metal thickness BF.

The axial distance Ab of the attachment portions 43a,b can preferably be approximately 15 times the sheet metal thickness BS.

Figure 9:
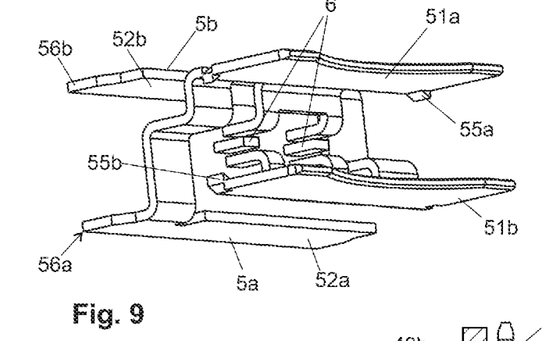
FIG. 9 is an enlarged, schematic, perspective view of more example flux conductors, which are exposed analogously to FIG. 5.
Figure 10:
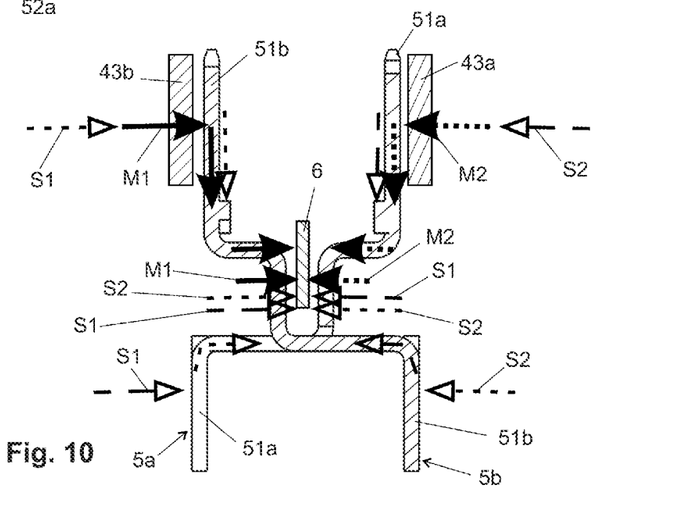
FIG. 10 is a partial, radial, sectional view of another example rotation sensor that includes flux conductors according to FIG. 9.

FIGS. 9 and 10 in the same views as FIGS. 5 and 6 show an alternative arrangement of the flux conductors 5a,b. The connecting portions 53a,b cross one another closer to the compensator portions 52a,b, while they cross one another closer to the collecting portions 51a,b in the previously described embodiment.

Figure 11:
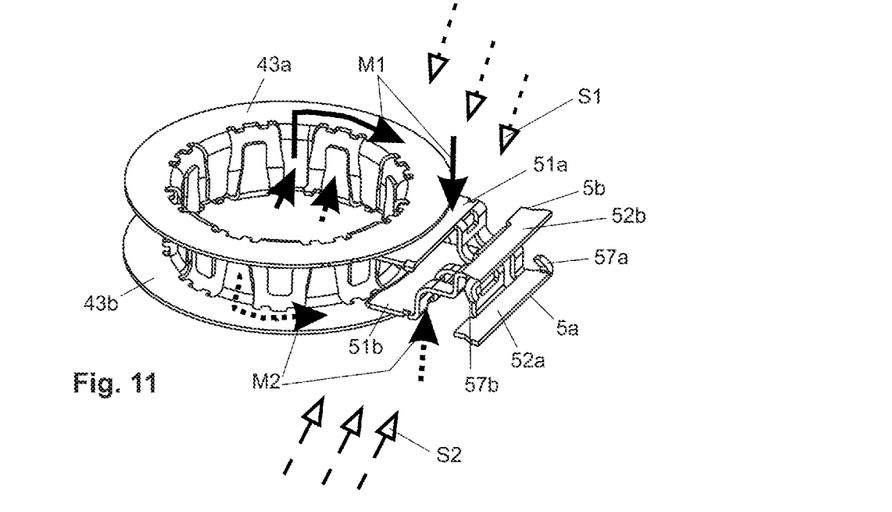
FIG. 11 is a schematic, perspective view of stator elements and flux conductors of a rotation sensor according to FIGS. 9 and 10, which are exposed analogously to FIG. 4.
Figure 12:
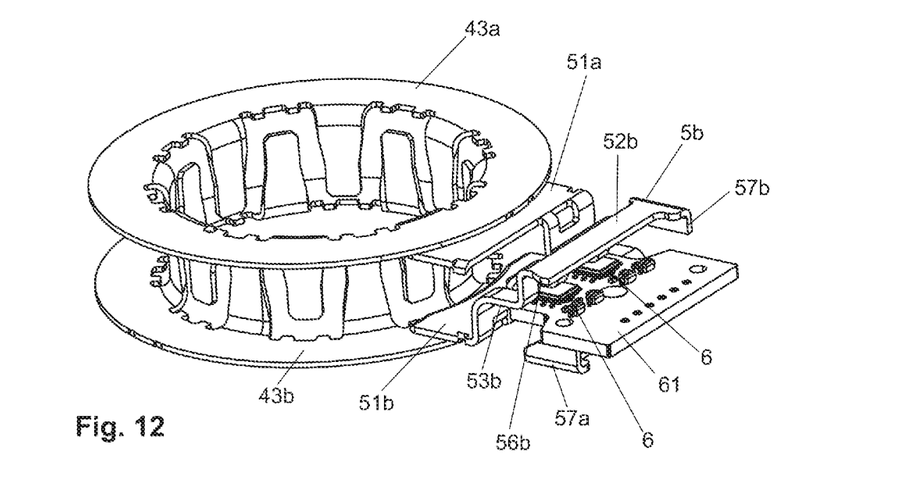
FIG. 12 is a schematic, perspective view of still further example stator elements and flux conductors of a rotation sensor, which are exposed analogously to FIG. 4.
Figure 13:
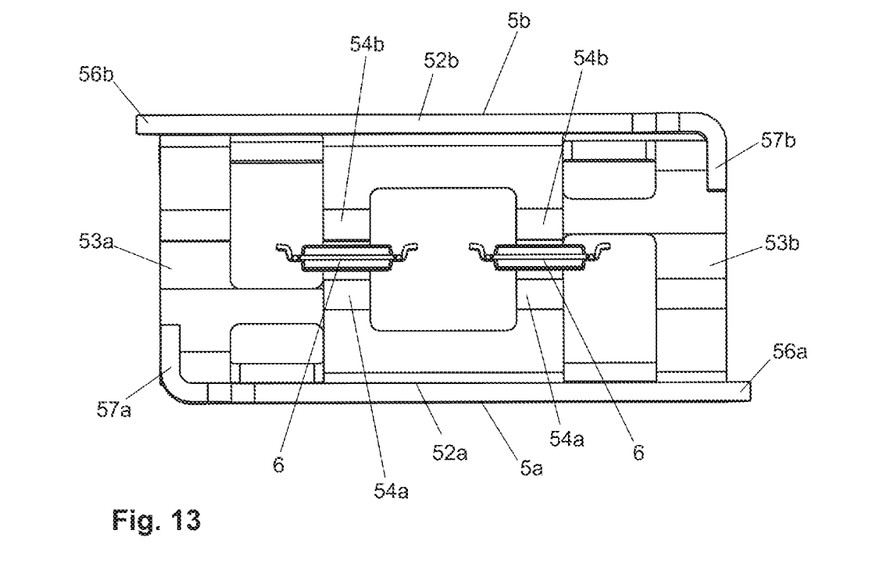
FIG. 13 is an enlarged radial view from an outside of a rotation sensor according to FIG. 12.

The development of the present disclosure shown in FIGS. 11 to 13 has the functional elements of the above-described first embodiment, and accordingly the same reference signs are used.

As in the first embodiment, there are two sensor elements 6 which are mounted on a printed circuit board 61 (circuit board 61) and are electrically connected.

In addition to the first embodiment, the compensator portions 52a,b each have an angled wing portion 57a,b, also referred to as winglet, which protrudes in the axial direction into the intermediate space between the compensator portions 52a,b, as can be seen in the radial view of FIG. 13. A wing portion 57a,b can have dimensions in a ratio to the sheet metal thickness Bf, as is defined above in the description of the present disclosure.

The flux conductors 5a,b are introduced in sections into the interior of a housing 8. The sensor elements 6 are likewise accommodated therein.

LIST OF REFERENCE SIGNS

1 Steering system
10 Steering shaft part
1001 first anti-twist device
10011 Recess
10012 Protrusion, tooth
1002 torsionally elastic torsion bar
1003 Pin
11 Steering shaft part
1101 second anti-twist device
11011 Recess
11012 Protrusion, tooth
12 Steering wheel
13 Cross joint
14 Pinion
15 Rack
16 Track rod
17 Wheel
2 Steering column
21 Supporting unit
3,31 Power-assisted drive
4 Rotation sensor
41 Magnet (ring magnet)
42a,b Stator element
43a,b Attachment portion
5a,b Flux conductor
51a,b Collecting portion
52a,b Compensator portion
53a,b Connecting portion
54a,b Flux finger
55a,b Stop portion
56a,b Guide portion
57a,b Wing portion (winglet)
6 Sensor element
61 Printed circuit board
73 Cable
8 Housing
9 Gearwheel
L Axis
M1 Measurement flux
M2 Measurement flux
S1 Interference flux
S2 Interference flux
SX Flux deflection
BF Sheet metal thickness
BS Sheet metal thickness
Ab axial distance As axial distance
Ak axial distance
Ra radial distance
Rs radial width
Lu axial distance (air gap)

What is claimed is:

1. A steering system for a motor vehicle having a rotation sensor, comprising:
   a magnetic element that is attached to a steering shaft and is rotatable with the steering shaft about an axis, wherein the steering shaft includes an upper shaft and a lower shaft, and wherein the upper shaft is connected to the lower shaft via a torsion bar; and
   two stator elements that are arranged fixed coaxially relative to the steering shaft, that are spaced apart axially from one another, and that are operatively connected to a sensor element via two flux conductors, wherein each flux conductor has a collecting portion, a connecting portion, and a compensator portion, wherein respective compensator portions on each of the two flux conductor have an angled wing portion that is bent over transversely on a terminal outermost edge of the compensator portion and protrudes in an axial direction outboard of the respective sensor element and into an intermediate space between the respective compensator portions, wherein the collecting portion is operatively connected to one of the stator elements and is connected to the compensator portion via the connecting portion, wherein the sensor element is arranged between the two flux conductors.

2. The steering system of claim 1 wherein a surface ratio of the collecting surface and the compensator surface is between 1 and 4.

3. The steering system of claim 1 wherein the flux conductors are configured as integral sheet metal parts.

4. The steering system of claim 1 wherein the flux conductors are crossed between the compensator portions and the collecting portions in a region of the connecting portions such that the compensator portions and the collecting portions lie axially opposite one another.

5. The steering system of claim 1 wherein the collecting portions are operatively connected to attachment portions of the stator elements, wherein the compensator surfaces and the collecting surfaces of the flux conductors are substantially parallel to one another and to attachment portions of the stator elements.

6. The steering system of claim 1 wherein the collecting portions are attached on axially opposite inner sides of the stator elements.

7. The steering system of claim 1 wherein an axial distance between the collecting portions is smaller than an axial distance between the compensator portions.

8. The steering system of claim 1 wherein the compensator portions are aligned flush with attachment portions of the stator elements.

9. The steering system of claim 1 wherein the compensator portions are connected to coupling portions that have coupling surfaces facing the sensor element.

10. The steering system of claim 1 wherein the sensor element is a first sensor element, the steering system comprising a second sensor element that is spaced apart from the first sensor element.

11. The steering system of claim 1 wherein the flux conductors and the sensor element are disposed in a housing.

12. The steering system of claim 1 wherein at least one of the compensator portions and/or at least one of the collecting portions has a guide portion.

13. The steering system of claim 1 wherein the collecting portion of a first of the flux conductors and the compensator portion of a second of the flux conductors are at a radial distance from one another, wherein the radial distance has a ratio with respect to a radial width of the collecting portion of the second of the flux conductors of between 0.5 and 2.

14. The steering system of claim 1 wherein the collecting portion of a first of the flux conductors has an axial height difference with respect to the compensator portion of a second of the flux conductors, wherein the axial height difference has a ratio with respect to an axial thickness of the collecting portion of the first of the flux conductors of between 0.5 to 2.

15. The steering system of claim 1 wherein the collecting portion of a first of the flux conductors has an axial height difference with respect to the compensator portion of the first of the flux conductors, wherein the axial height difference has a ratio with respect to an axial height difference between the compensator portions of the two flux conductors of between 0.75 and 2.2.

16. The steering system of claim 1 wherein in a region in which the sensor element is arranged, the flux conductors have an axial height distance in a range of 1.8 to 2.2 of an axial thickness of the flux conductors.

17. The steering system of claim 1 wherein an axial height distance between the flux conductors and the sensor element is smaller than an axial thickness of the flux conductors.

18. The steering system of claim 1, wherein an anti-twist device which is arranged on the upper steering shaft is brought into engagement with an anti-twist device, which is arranged on the lower steering shaft, for limiting a twisting of the torsion bar in itself.

19. The steering system of claim 1 wherein the angled wing portion protrudes entirely outboard of the respective sensor element.

20. A steering system for a motor vehicle having a rotation sensor, comprising:
   a magnetic element that is attached to a steering shaft and is rotatable with the steering shaft about an axis; and
   two stator elements that are arranged fixed coaxially relative to the steering shaft, that are spaced apart axially from one another, and that are operatively connected to a sensor element via two flux conductors, wherein each flux conductor has a collecting portion, a connecting portion, and a compensator portion, wherein respective compensator portions on each of the two flux conductor have an angled wing portion that is bent over transversely on a terminal outermost edge of the compensator portion and protrudes in an axial direction outboard of the respective sensor element and into an intermediate space between the respective compensator portions, wherein the collecting portion is operatively connected to one of the stator elements and is connected to the compensator portion via the connecting portion, wherein the sensor element is arranged between the two flux conductors.

21. A steering system for a motor vehicle having a rotation sensor, comprising:
   a magnetic element that is attached to a steering shaft and is rotatable with the steering shaft about an axis; and
   two stator elements that are arranged fixed coaxially relative to the steering shaft, that are spaced apart axially from one another, and that are operatively connected to a sensor element via two flux conductors, wherein each flux conductor has a collecting portion, a connecting portion, and a compensator portion, wherein respective compensator portions on each of the two flux conductor have an angled wing portion that is bent over transversely on a terminal outermost edge of the compensator portion and protrudes in an axial direction outboard of the respective sensor element and into an intermediate space between the respective compensator portions, wherein the collecting portion is operatively connected to one of the stator elements and is connected to the compensator portion via the connecting portion, wherein the sensor element is arranged between the two flux conductors, wherein a surface ratio of a collecting surface of the collection portion and a compensator surface of the compensator portion is less than 1 and greater than 0.5, and wherein the flux conductors and the sensor element are disposed in a housing.

22. A steering system for a motor vehicle having a rotation sensor, comprising:
- a magnetic element that is attached to a steering shaft and is rotatable with the steering shaft about an axis; and
- two stator elements that are arranged fixed coaxially relative to the steering shaft, that are spaced apart axially from one another, and that are operatively connected to a sensor element via two flux conductors, wherein each flux conductor has a collecting portion, a connecting portion, and a compensator portion, wherein respective compensator portions on each of the two flux conductor have an angled wing portion that is bent over transversely on a terminal outermost edge of the compensator portion and protrudes in an axial direction outboard of the respective sensor element and into an intermediate space between the respective compensator portions, wherein the collecting portion is operatively connected to one of the stator elements and is connected to the compensator portion via the connecting portion, wherein the sensor element is arranged between the two flux conductors, wherein a surface ratio of a collecting surface of the collection portion and a compensator surface of the compensator portion is greater than 1 and less than 4, wherein the connecting portion is web-shaped.

* * * * *